(12) United States Patent
Qiao et al.

(10) Patent No.: US 11,177,705 B2
(45) Date of Patent: Nov. 16, 2021

(54) PERMANENT MAGNET MOTOR, COMPRESSOR AND REFRIGERATION SYSTEM

(71) Applicant: GUANGDONG MEIZHI COMPRESSOR CO., LTD., Guangdong (CN)

(72) Inventors: Zhengzhong Qiao, Guangdong (CN); Linshu Mao, Guangdong (CN); Xiaohua Qiu, Guangdong (CN); Yangbo Yu, Guangdong (CN)

(73) Assignee: GUANGDONG MEIZHI COMPRESSOR CO., LTD., Foshan (CN)

( * ) Notice: Subject to any disclaimer, the term of this patent is extended or adjusted under 35 U.S.C. 154(b) by 137 days.

(21) Appl. No.: 16/730,199

(22) Filed: Dec. 30, 2019

(65) Prior Publication Data

US 2020/0136448 A1    Apr. 30, 2020

Related U.S. Application Data

(63) Continuation of application No. PCT/CN2017/113996, filed on Nov. 30, 2017.

(30) Foreign Application Priority Data

Jun. 30, 2017  (CN) .................... 201710527690.X
Jun. 30, 2017  (CN) .................... 201720796480.6

(51) Int. Cl.
*H02K 1/27*        (2006.01)
*H02K 1/14*        (2006.01)
(Continued)

(52) U.S. Cl.
CPC ........... *H02K 1/2766* (2013.01); *H02K 1/146* (2013.01); *H02K 3/28* (2013.01); *H02K 11/33* (2016.01);
(Continued)

(58) Field of Classification Search
CPC .. H02K 1/27; H02K 1/14; H02K 3/28; H02K 11/33; H02K 21/16
(Continued)

(56) References Cited

U.S. PATENT DOCUMENTS 5,394,321 A * 2/1995 McCleer .............. H02K 21/12
                                                   310/180
7,034,524 B2   4/2006 Schumacher
(Continued)

FOREIGN PATENT DOCUMENTS

CN        203896149 U    10/2014
CN        104300710 A     1/2015
(Continued)

OTHER PUBLICATIONS

Supplementary European Search Report dated Jun. 15, 2020 received in European Patent Application No. EP 17916058 5.
(Continued)

*Primary Examiner* — Alex W Mok
(74) *Attorney, Agent, or Firm* — Scully Scott Murphy & Presser

(57) ABSTRACT

Disclosed are a permanent magnet motor, a compressor and a refrigeration system. In the permanent magnet motor, the diameter D of a contour circle of the smallest inner periphery of a stator, the diameter d of a contour circle of the largest outer periphery of a rotor, the fundamental wave amplitude Bm1 of an air-gap flux density at an average gap between the stator and the rotor, the axial length L of the rotor, the total number of serially connected turns Ns of each phase winding, and a bus DC voltage Udc of a frequency converter supplying power to the permanent magnet motor before inversion are set as: $0.003\ Udc \leq (D+d) \times L \times Bm1 \times Ns \leq 0.008\ Udc$.

10 Claims, 5 Drawing Sheets

(51) Int. Cl.
*H02K 3/28* (2006.01)
*H02K 11/33* (2016.01)
*H02K 21/16* (2006.01)
*H02K 29/03* (2006.01)

(52) U.S. Cl.
CPC ........ *H02K 21/16* (2013.01); *F25B 2400/077* (2013.01); *H02K 29/03* (2013.01); *H02K 2203/06* (2013.01); *H02K 2213/03* (2013.01)

(58) Field of Classification Search
USPC ...................................................... 310/68 D
See application file for complete search history.

(56) References Cited

U.S. PATENT DOCUMENTS

| | | | | |
|---|---|---|---|---|
| 2004/0245881 | A1* | 12/2004 | Kadoya | H02K 1/146 310/185 |
| 2009/0134731 | A1 | 5/2009 | Okumoto et al. | |
| 2016/0285330 | A1* | 9/2016 | Mukai | F04C 29/0085 |

FOREIGN PATENT DOCUMENTS

| | | |
|---|---|---|
| CN | 106300751 A | 1/2017 |
| CN | 107171522 A | 9/2019 |
| JP | S52-065807 A | 5/1977 |
| JP | 2000-357890 A | 12/2000 |
| JP | 2005-124281 A | 5/2005 |
| JP | 2012-055117 A | 3/2012 |
| JP | 2015-092817 A | 5/2015 |
| WO | 2016/090727 A1 | 6/2016 |

OTHER PUBLICATIONS

Hanselman, D., "Chapter 8, Electrical Control", Brushless Permanent Magnet Motor Design, Jan. 1, 2006, pp. 183-202.
Hanselman, D., "Chapter 4, Brushless Motor Fundamentals", Brushless Permanent Magnet Motor Design, Jan. 1, 2006, pp. 67-116.
International Search Report dated Mar. 23, 2018 issued in PCT/CN2017/113996.
Notice of Reasons for Refusal dated Dec. 22, 2020 received in Japanese Patent Application No. JP 2019-570984 together with an English language translation.
Examination Report dated Jul. 3, 2021 received in Indian Patent Application No. IN 202027000920.

* cited by examiner

Air-gap flux density oscillogram

Result of air-gap flux density after FFT decomposition

Comparison diagram of energy efficiency of compressors

PERMANENT MAGNET MOTOR, COMPRESSOR AND REFRIGERATION SYSTEM

CROSS-REFERENCE TO RELATED APPLICATION

This application is based upon and claims the benefit of priority from International Application No. PCT/CN2017/113996, filed Nov. 30, 2017, the entire contents of which are incorporated herein by reference for all purposes. No new matter is added.

FIELD

The present disclosure relates to the field of refrigeration technology, and more particularly, to a permanent magnet motor, a compressor and a refrigeration system.

BACKGROUND

In the field of compressors, stators of permanent magnet motors typically adopt windings in the manner of star connection. In the prior art, conductors of the windings are thick in some high-power or low-voltage occasions, resulting in poor manufacturability and degrading the performance.

SUMMARY

The present disclosure aims to solve one of the technical problems in the related art to some extent. Accordingly, an objective of the present disclosure is to propose a permanent magnet motor having high energy efficiency.

The present disclosure further proposes a compressor and a refrigeration system.

The permanent magnet motor according to embodiments of the present disclosure has a stator and a rotor. The stator has a stator core and a stator winding, and the rotor has a rotor core and a permanent magnet provided on the rotor core. The stator winding includes an A-phase winding, a B-phase winding, and a C-phase winding; a second group of connectors of the A-phase winding and a first group of connectors of the B-phase winding are connected to a common lead-out wire; a second group of connectors of the B-phase winding and a first group of the C-phase winding are connected to a common lead-out wire; a second group of connectors of the C-phase winding and a first group of connectors of the A-phase winding are connected to a common lead-out wire. The diameter D (m) of a contour circle of the smallest inner periphery of the stator, the diameter d (m) of a contour circle of the largest outer periphery of the rotor, the fundamental wave amplitude Bm1 (T) of an air-gap flux density at an average gap between the stator and the rotor, the axial length L (m) of the rotor, the total number of serially connected turns Ns of each phase winding, and a bus DC voltage Udc (V), before inversion, of a frequency converter supplying power to the permanent magnet motor are set as: $0.003 \text{ Udc} \leq (D+d) \times L \times Bm1 \times Ns \leq 0.008 \text{ Udc}$.

For the permanent magnet motor according to the embodiments of the present disclosure, the key parameter ranges of the permanent magnet motor are designed to be different from the parameter ranges of the motor of the conventional compressor, and improve the problem that the energy efficiency of the compressor is reduced when the traditional parameter ranges are applied to the triangular winding structure, thereby rendering a good application prospect to the permanent magnet motor of the compressor having the triangular winding structure.

In addition, the permanent magnet motor according to the above embodiments of the present disclosure can have the additional technical features as follows.

In an embodiment of the present disclosure, the Udc satisfies: $250 \leq \text{Udc} \leq 540$.

Further, $1.2 \leq (D+d) \times L \times Bm1 \times Ns \leq 4.0$.

In an embodiment of the present disclosure, the Udc satisfies: $\text{Udc} \leq 72$.

Further, $0.03 \leq (D+d) \times L \times Bm1 \times Ns \leq 0.5$.

In an embodiment of the present disclosure, each phase winding has one or two or more coil groups.

In an embodiment of the present disclosure, the current for the second group of connectors of the A-phase winding and the current for the first group of connectors of the B-phase winding have the same phase at the same time; the current for the second group of connectors of the B-phase winding and the current for the first group of connectors of the C-phase winding have the same phase at the same time; the current for the second group of connectors of the C-phase winding and the current for the first group of the A-phase winding have the same phase at the same time.

The present disclosure further proposes a compressor including the above permanent magnet motor.

The present disclosure further proposes a refrigeration system, including a compressor and a frequency converter. The compressor is configured as the above compressor. The frequency converter is connected to the compressor and has an inverter.

In an embodiment of the present disclosure, the frequency converter further has a rectifier.

Figure 1:
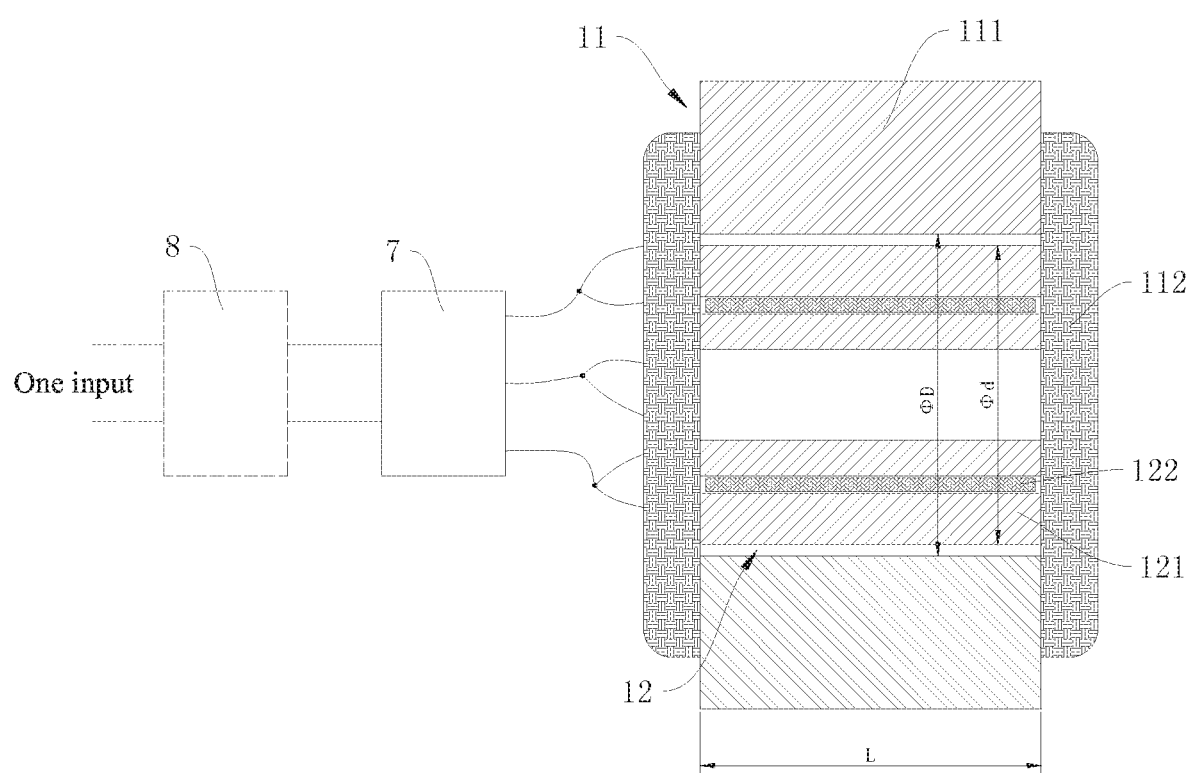
FIG. 1 is a schematic view of a projection of a permanent magnet motor connected with a frequency converter according to an aspect of the present disclosure.

Reference numerals: compressor 100, cylinder 2, main bearing 3, auxiliary bearing 4, piston 5, crankshaft 6, permanent magnet motor 1, stator 11, rotor 12, stator core 111, stator winding 112, rotor core 121, permanent magnet 122, inverter 7, rectifier 8.

DETAILED DESCRIPTION OF EXEMPLARY EMBODIMENTS

Exemplary embodiments of the present disclosure will be described in detail below, and examples of the embodiments will be shown in the drawings, wherein the same or similar elements and the elements having same or similar functions are denoted by like reference numerals throughout the descriptions. The embodiments described herein with reference to the drawings are exemplary and used to generally understand the present disclosure. The embodiments shall not be construed to limit the present disclosure.

According to an aspect of the disclosure, a permanent magnet motor 1 is provided. According to another aspect of the disclosure, a compressor 100, which utilizes the permanent magnet motor 1, is provided.

For example, in the compressor 100, if the permanent magnet motor 1 adopts delta connection, the manufacturability of both the motor and the compressor can be improved considerably.

If parameters of triangular windings, such as magnetic property, size, and so on, are set in accordance with the ranges of existing motors and compressors, problems of unsatisfactory motor performance and low energy efficiency of the existing compressors will occur.

Hereinafter, the permanent magnet motor 1 according to embodiments of the present disclosure will be described with reference to the drawings.

The permanent magnet motor 1 according to the embodiments of the present disclosure has a stator 11 and a rotor 12. The stator 11 includes a stator core 111 and a stator winding 112. The rotor 12 includes a rotor core 121 and a permanent magnet 122 disposed on the rotor core 121. The stator winding 112 includes an A-phase winding, a B-phase winding, and a C-phase winding. The A-phase winding, the B-phase winding and a C-phase winding each include a first group of connectors and a second group of connectors. The second group of connectors of the A-phase winding and the first group of connectors of the B-phase winding are connected to a common lead-out wire. The second group of connectors of the B-phase winding and the first group of the C-phase winding are connected to a common lead-out wire. The second group of connectors of the C-phase winding and the first group of connectors of the A-phase winding are connected to a common lead-out wire.

As shown in FIG. 1, the diameter D (m) of a contour circle of the smallest inner periphery of the stator 11, the diameter d (m) of a contour circle of the largest outer periphery of the rotor 12, the fundamental wave amplitude Bm1 (T) of an air-gap flux density at an average gap between the stator 11 and the rotor 12, the axial length L (m) of the rotor 12, the total number of serially connected turns Ns of each phase winding, and the bus DC voltage Udc (V), before inversion, of a frequency converter supplying power to the permanent magnet motor 1 are set as: $0.003\ Udc \leq (D+d) \times L \times Bm1 \times Ns \leq 0.008\ Udc$. In addition, the fundamental wave amplitude Bm1 of the air-gap flux density at the average gap between the stator and the rotor 12 can be a value detected under 25° C.

For the permanent magnet motor 1 according to the embodiments of the present disclosure, the parameter-ranges of the permanent magnet motor 1 are distinguished from the parameter-ranges of the motor of the existing compressors. Compared with the existing compressors, the energy efficiency of the compressor 100 can be considerably improved, for example, when the parameter-ranges are applied to the triangular winding structure. As a result, the permanent magnet motor and the compressor, according to the embodiments of the present disclosure, can achieve unexpected improvement in energy efficiency and motor performance, particularly when the permanent magnet motor 1 of the compressor 100 adopts the triangular winding structure.

In addition, the permanent magnet motor 1 according to the above embodiments of the present disclosure may also have the following additional technical features.

The permanent magnet motor 1 of the present disclosure can be powered by DC power or AC power. In order to further improve the energy efficiency, when the AC power is used, the Udc satisfies: $250 \leq Udc \leq 540$. Further, $1.2 \leq (D+d) \times L \times Bm1 \times Ns \leq 4.0$.

When the DC power is used, the Udc satisfies: $Udc \leq 72$. Further, $0.03 \leq (D+d) \times L \times Bm1 \times Ns \leq 0.5$.

However, the above ranges of the permanent magnet motor 1 in the present disclosure are not limited to the above-mentioned power supply. For example, the DC power satisfying the above requirements of "$250 \leq Udc \leq 540$" and "$1.2 \leq (D+d) \times L \times Bm1 \times Ns \leq 4.0$" can also be used, or the AC power satisfying the requirements of "$Udc \leq 72$" and "$0.03 \leq (D+d) \times L \times Bm1 \times Ns \leq 0.5$" can also be used.

It has been discovered through experiments that, by providing the Udc, the diameters, the fundamental wave amplitude, the axial length, and the total number of serially connected turns of each phase winding as defined in the above relationship, the energy efficiency of the motor can be unexpectedly improved.

In an embodiment of the present disclosure, each phase winding has one or two or more coil groups.

In an embodiment of the present disclosure, for the second group of connectors of the A-phase winding and the first group of connectors of the B-phase winding, the currents have the same phase at the same time. For the second group of connectors of the B-phase winding and the first group of connectors of the C-phase winding, the currents have the same phase at the same time. For the second group of connectors of the C-phase winding and the first group of the A-phase winding, the currents have the same phase at the same time.

For the compressor 100 according to the embodiments of the present disclosure, since the aforementioned permanent magnet motor 1 is used, the compressor 100 improves the energy efficiency and enjoys a good application prospect.

The present disclosure also provides a refrigeration system including the compressor 100 and a frequency converter. The frequency converter is connected to the compressor 100, and the frequency converter includes an inverter 7.

In an embodiment of the present disclosure, the frequency converter further includes a rectifier 8.

FIG. 1 is a schematic view of an axial projection of the permanent magnet motor 1 according to a first embodiment of the present disclosure connected with a frequency converter. A three-phase permanent magnet motor 1 for the compressor 100 includes the stator 11 and the rotor 12. The stator 11 includes a stator core 111 and a stator winding 112. The rotor 12 includes a rotor core 121 and a permanent magnet 122 provided on the rotor core 121. The second group of connectors of an A-phase winding of the stator winding 112 and the first group of connectors of a B-phase winding thereof are connected to a common lead-out wire; and for these two groups of connectors, the currents have the same phase. The second group of connectors of the B-phase winding of the stator winding 112 and the first group of a C-phase winding thereof are connected to a common lead-out wire; and for these two groups of connectors, the currents have the same phase. The second group of connectors of the C-phase winding of the stator winding 112 and the first group of connectors of the A-phase winding thereof are connected to a common lead-out wire; and for these two groups of connectors, the currents have the same phase.

The diameter D (m) of a contour circle of the smallest inner periphery of the stator 11, the diameter d (m) of a contour circle of the largest outer periphery of the rotor 12, the fundamental wave amplitude Bm1 (T) of an air-gap flux density at an average gap between the stator and the rotor 12 (as detected under an environmental temperature of 25° C.), the axial length L (m) of the rotor 12, the total number of serially connected turns Ns of each phase winding, and the bus DC voltage Udc (V), before inversion, of a frequency converter supplying power to the permanent magnet motor 1 are set as: $0.003 \ Udc \le (D+d) \times L \times Bm1 \times Ns \le 0.008 \ Udc$, wherein D, d, Bm1, L, and Udc are values without units.

The frequency converter connected to the permanent magnet motor 1 at least includes an inverter 7. At a front end of the inverter 7 is DC power, and the DC bus voltage is set to Udc; the DC power is converted into AC power of controllable frequency after the inversion of the inverter 7. When a power source supplies DC power, the DC power source is directly connected to the inverter 7 to realize a conversion process of DC→AC. When the power source supplies AC power, a rectifier 8 is required, the AC power source is connected to an input side of the rectifier 8, and an output side of the rectifier 8 is connected to an input side of the inverter 7, to realize a conversion process of AC→DC→AC.

In the field of compressors, the present disclosure is different from the existing devices in that the key parameters of the permanent magnet motor 1 are set in ranges that achieve unexpected results not provided by the existing devices. At the same time, when the triangular winding structure is applied, excellent manufacturability of the stator 11 and the high efficiency of the compressor 100 can also be achieved, unexpectedly.

Figure 2:
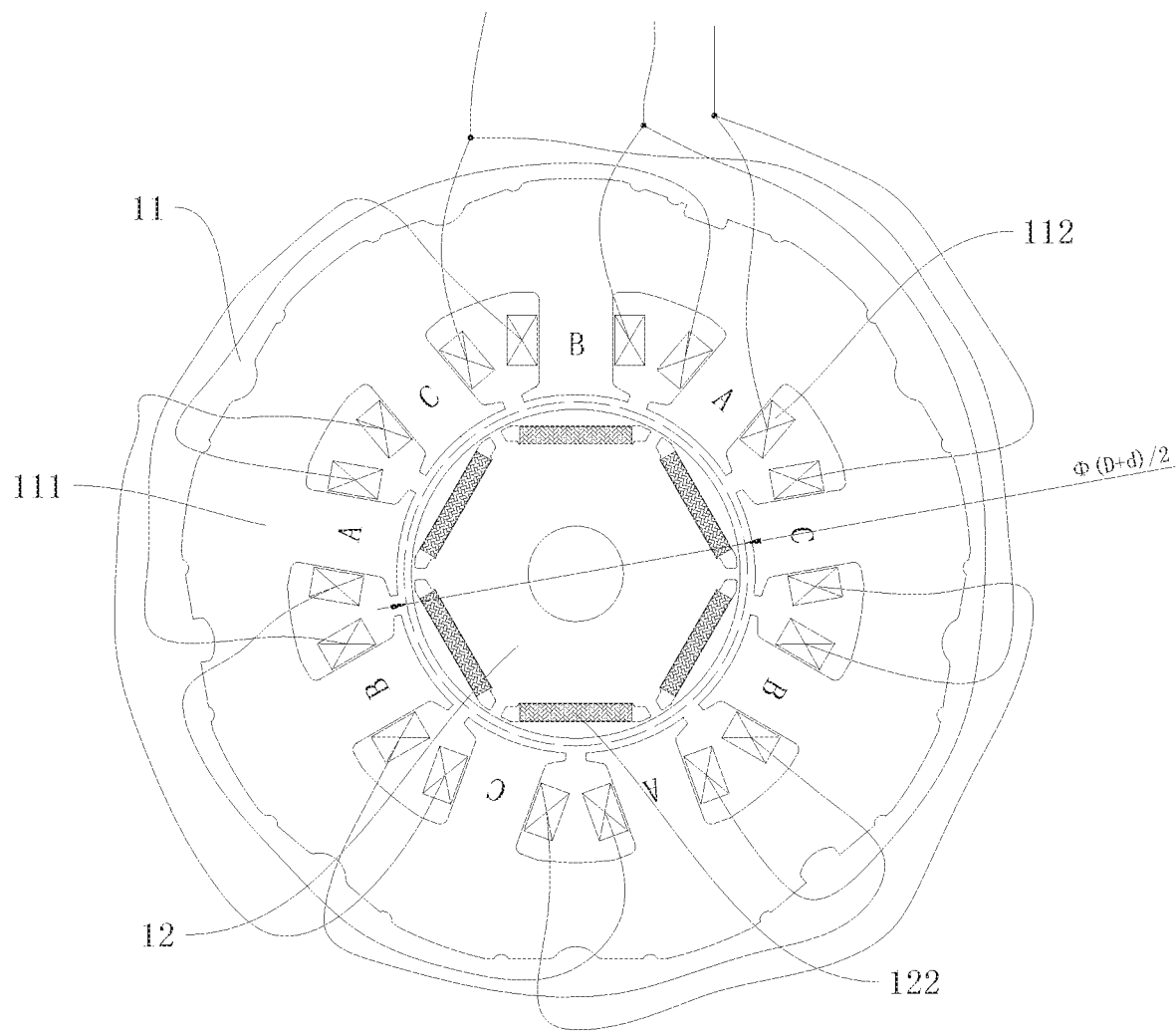
FIG. 2 is a cross-sectional view of the permanent magnet motor in FIG. 1 along a plane perpendicular to a longitudinal axis of the permanent magnet motor.

FIG. 2 is a sectional view of the permanent magnet motor 1 in FIG. 1 along a plane perpendicular to an axis that is longitudinal of the permanent magnet motor 1. In the first embodiment, the permanent magnet motor 1 has a structure with nine slots and six poles. Each phase winding has three groups of coils, and each group of coils is wound around a tooth of the stator 11. Each phase winding has one incoming connector and one outgoing connector, and different coil groups of the same phase winding are connected through transition wires. By way of example, one of the connection manners between the winding connectors and the lead-out wire is: A-phase outgoing connector+B-phase incoming connector→first lead-out wire; B-phase outgoing connector+C-phase incoming connector→second lead-out wire; C-phase outgoing connector+A-phase incoming connector→third lead-out wire. It should be noted that there are many specific ways of the winding connection mentioned in the present disclosure.

Figure 3:
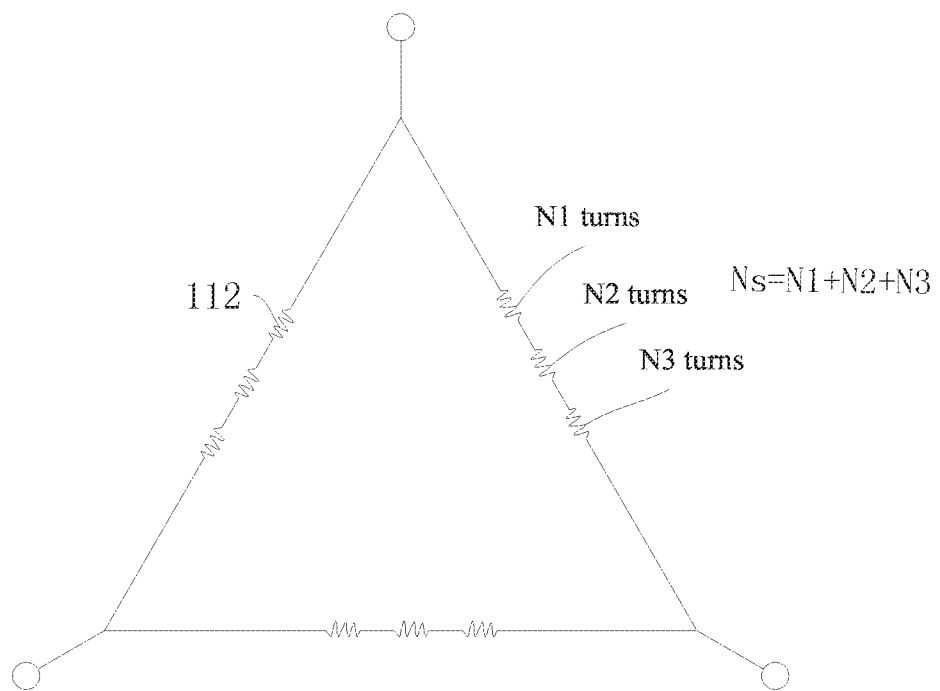
FIGS. 3 and 4 are schematic views of connection of stator windings of the permanent magnet motor of FIG. 2 according to alternative embodiments.

FIG. 3 is a schematic view showing the winding connection of the permanent magnet motor 1 of FIG. 2. In the first embodiment, the windings of the same phase are connected in series. The numbers of turns of the three coil groups for the windings of the same phase are N1, N2, N3, respectively, and the total number of serially connected turns of the windings of the same phase is Ns=N1+N2+N3.

Figure 4:
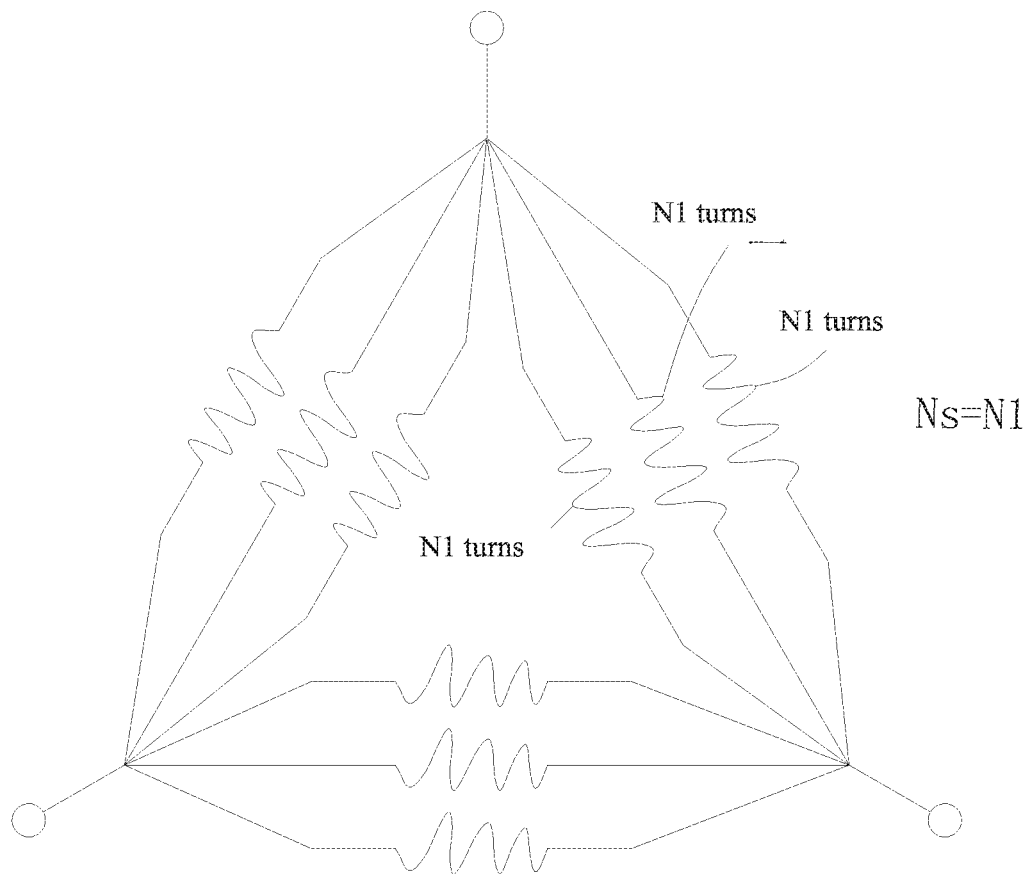

FIG. 4 is a schematic view showing the winding connection according to a second embodiment of the present disclosure. In the second embodiment, the windings of the same phase are connected in parallel, and the number of parallel branches is three. In general, in order to ensure the balance of the motor, in the parallel mode, the number of turns of each coil group of the same phase is close, or equal. The number of turns of each of the three coil groups connected in parallel is N1, so the total number of turns of the windings in series is Ns=N1.

Figure 5:
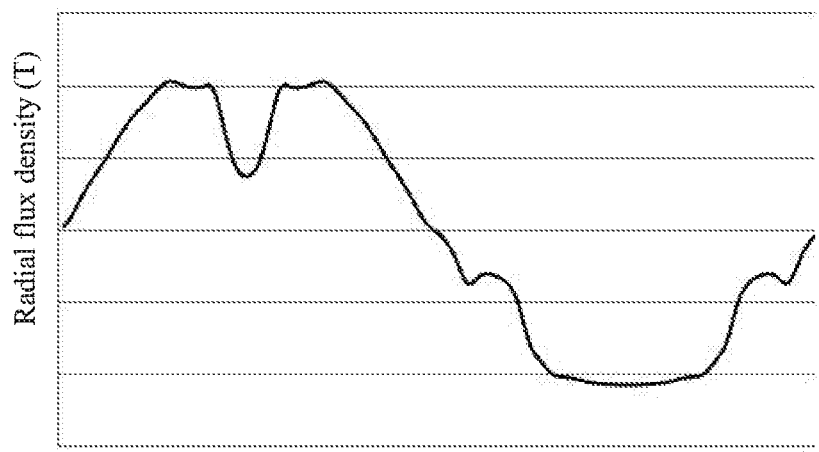
FIG. 5 is an oscillogram showing an air-gap flux density when a permanent magnet motor of the present disclosure is applied.

FIG. 5 is an oscillogram showing an air-gap flux density when the permanent magnet motor 1 of the present disclosure is applied. In an intermediate position of a gap between the stator 11 and the rotor 12, that is, on the circumference of (D+d)/2 in FIG. 2, the air-gap flux density of the permanent magnet motor 1 is extracted, in which the oscillogram of the air-gap flux density in one electrical cycle is shown in FIG. 5. Under the influence of factors, such as the structure of the embedded rotor 12, and a cogging effect of the stator and the rotor 12, the oscillogram of the air-gap flux density does not show an ideal sine wave, and also includes the harmonic wave besides the fundamental wave.

Figure 6:
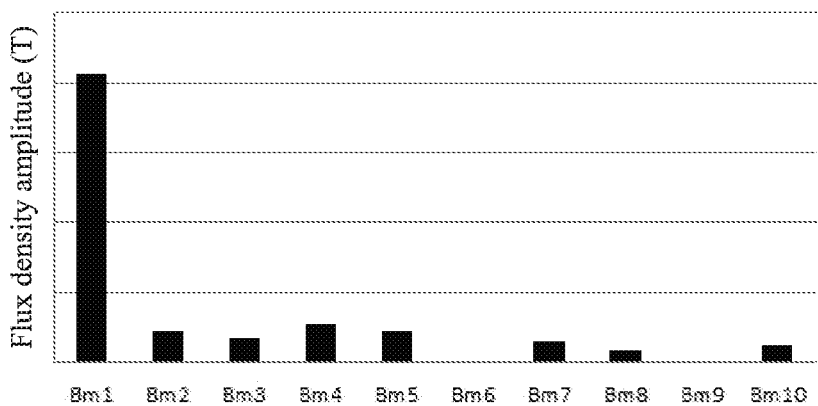
FIG. 6 is a plot of the fundamental wave and harmonic wave of the air-gap flux density in FIG. 5 after Fourier decomposition.

FIG. 6 is a plot of the fundamental wave and harmonic wave of the air-gap flux density in FIG. 5 after Fourier decomposition. FIG. 6 only lists the fundamental wave and the previous nine harmonic waves in addition to the fundamental wave. The air-gap flux density is a core indicator reflecting the performance and noise of the permanent magnet motor 1. During energy conversion, the fundamental wave of the air-gap flux density plays a major role in driving the rotational output of the rotor 12, so the design of the fundamental wave of the air-gap flux density is particularly important.

Figure 7:
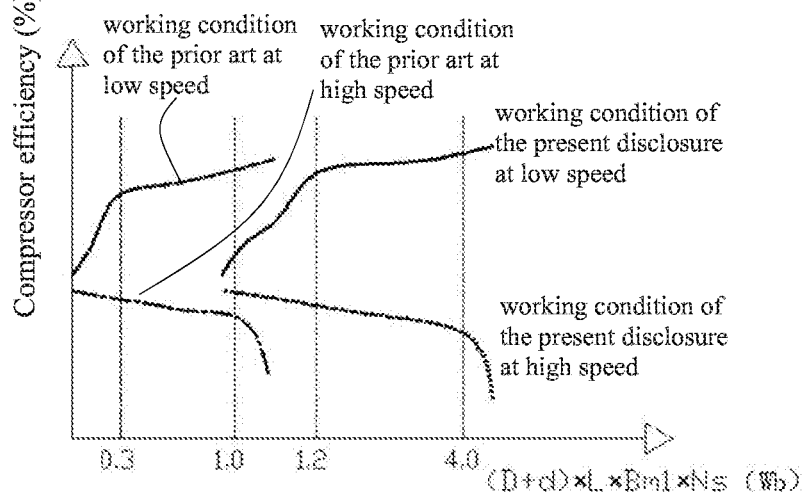
FIG. 7 is a schematic view showing comparison between the energy efficiency of a compressor equipped with a permanent magnet motor of the present disclosure and the energy efficiency of a compressor equipped with a permanent magnet motor of an existing permanent magnet motor.

FIG. 7 is a schematic view showing comparison between the energy efficiency of the compressor 100 equipped with the permanent magnet motor 1 of the present disclosure and that of a compressor equipped with an existing permanent magnet motor. Generally speaking, at a low speed, as a comprehensive parameter $(D+d) \times L \times Bm1 \times Ns$ increases, the energy efficiency of the compressor 100 shows an uptrend; at a high speed, with the increase of $(D+d) \times L \times Bm1 \times Ns$, the energy efficiency of the compressor 100 shows a downtrend, and even when $(D+d) \times L \times Bm1 \times Ns$ is higher than a certain critical point, the compressor 100 cannot operate at high speed. In an example of a compressor with a bus voltage Udc=310V, when equipped with an existing permanent magnet motor 1 having a star winding, in a range of $(D+d) \times L \times Bm1 \times Ns \le 1.0$ (unit: Wb), the high-speed energy efficiency of the compressor is maintained at a high level while the low-speed energy efficiency can be considered as well, such that a larger value can be selected before the inflection point to ensure the excellent performance of the compressor in the entire frequency band; when equipped with a permanent magnet motor 1 having the winding structure according to the present disclosure, if the related parameters are set in the traditionally ranges, the energy efficiency of the compressor at low speed is very low, but if $1.2 \le (D+d) \times L \times Bm1 \times Ns \le 4.0$ (unit: Wb), the compressor can have excellent performance in the entire frequency band.

Figure 8:
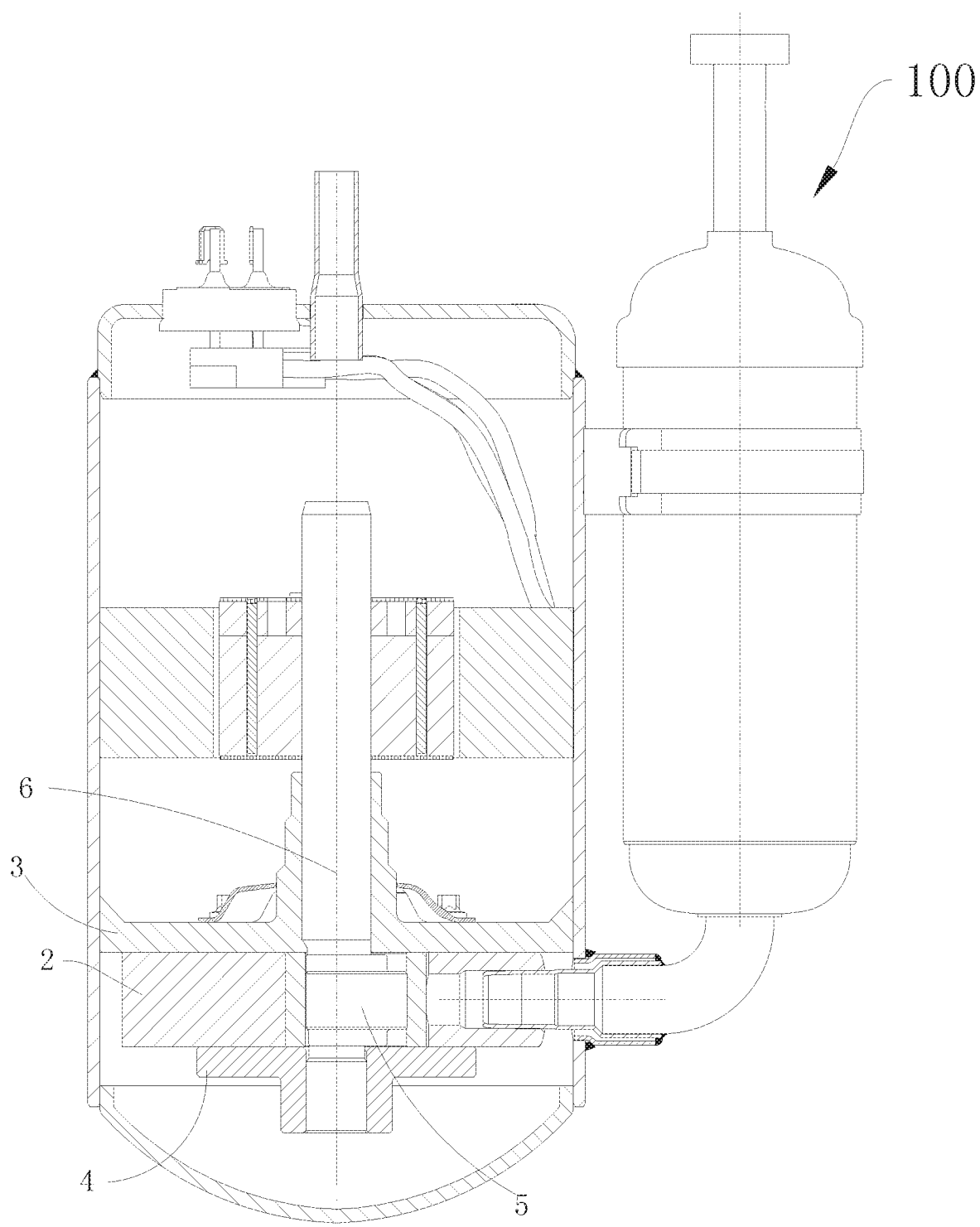
FIG. 8 is a schematic view of a compressor according to another aspect of the present disclosure.

FIG. 8 is a schematic view of the compressor 100 according to an exemplary embodiment of the present disclosure. In addition to the permanent magnet motor 1 as described above, the compressor 100 of the present disclosure further includes compression components, such as a cylinder 2, a main bearing 3, an auxiliary bearing 4, a piston 5, and a crankshaft 6.

In the specification, it is to be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial," and "circumferential" should be construed to refer to the orientation as then described or as shown in the drawings under discussion. These relative terms are for convenience and simplicity of description, and do not indicate or imply that the device or element referred to must have a particular orientation, or be constructed and operated in a particular orientation. Thus, these terms should not be constructed to limit the present disclosure.

In addition, the features defined with "first," and "second" may comprise one or more of this feature. Thus, the feature defined with "first" and "second" may comprise one or more of this feature. In the description of the present disclosure, the term "a plurality of" means two, three or etc., unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications or mutual interaction of two elements, which could be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the above terms throughout this specification are not necessarily referring to the same embodiment or example of the present disclosure. Furthermore, the particular features, structures, materials, or characteristics may be combined in any suitable manner in one or more embodiments or examples. In addition, without any contradiction, those skilled in the art may combine and incorporate different embodiments or examples and features of the different embodiments or examples described in this specification.

Although embodiments of the present disclosure have been shown and described, it would be appreciated by those skilled in the art that the above embodiments are exemplary, and various changes, modifications, alternatives and variations can be made in the embodiments without departing from the scope of the present disclosure.

What is claimed is:

1. A permanent magnet motor comprising:
   a stator and a rotor, the stator comprising a stator core and a stator winding, and the rotor comprising a rotor core and a permanent magnet provided on the rotor core, wherein the stator winding comprises an A-phase winding, a B-phase winding, and a C-phase winding, the A-phase winding, the B-phase winding and the C-phase winding each comprising a first group of connectors and a second group of connectors;
   wherein the second group of connectors of the A-phase winding and the first group of connectors of the B-phase winding are connected to a common lead-out wire; the second group of connectors of the B-phase winding and the first group of the C-phase winding are connected to a common lead-out wire; and the second group of connectors of the C-phase winding and the first group of connectors of the A-phase winding are connected to a common lead-out wire;
   wherein a contour circle of the smallest inner periphery of the stator has a diameter D, a contour circle of the largest outer periphery of the rotor has a diameter d, an air-gap flux density at an average gap between the stator and the rotor has a fundamental wave amplitude Bm1, the rotor has an axial length L, the total number of serially connected turns of each phase winding is Ns, and a frequency converter supplying power to the permanent magnet motor has a bus DC voltage Udc before inversion; and
   wherein the diameter D, the diameter d, the fundamental wave amplitude Bm1, the axial length L, the total number of serially connected turns Ns and the bus DC voltage Udc satisfy: $0.003\ Udc \leq (D+d) \times L \times Bm1 \times Ns \leq 0.008\ Udc$.

2. The permanent magnet motor according to claim 1, wherein the bus DC voltage Udc satisfies: $250 \leq Udc \leq 540$.

3. The permanent magnet motor according to claim 2, wherein the diameter D, the diameter d, the fundamental wave amplitude Bm1, the axial length L, and the total number of serially connected turns Ns satisfy: $1.2 \leq (D+d) \times L \times Bm1 \times Ns \leq 4.0$.

4. The permanent magnet motor according to claim 1, wherein the bus DC voltage Udc satisfies: $Udc \leq 72$.

5. The permanent magnet motor according to claim 4, wherein the diameter D, the diameter d, the fundamental wave amplitude Bm1, the axial length L, and the total number of serially connected turns Ns satisfy: $0.03 \leq (D+d) \times L \times Bm1 \times Ns \leq 0.5$.

6. The permanent magnet motor according to claim 1, wherein each phase winding has at least one coil group.

7. The permanent magnet motor according to claim 1, wherein:
   the current for the second group of connectors of the A-phase winding and the current for the first group of connectors of the B-phase winding have the same phase at the same time;
   the current for the second group of connectors of the B-phase winding and the current for the first group of connectors of the C-phase winding have the same phase at the same time; and
   the current for the second group of connectors of the C-phase winding and the current for the first group of the A-phase winding have the same phase at the same time.

8. A compressor comprising a permanent magnet motor according to claim 1.

9. A refrigeration system comprising:
   a compressor according to claim 8; and
   a frequency converter connected to the compressor and comprising an inverter.

10. The refrigeration system according to claim 9, wherein the frequency converter further comprises a rectifier.

\* \* \* \* \*